No. 865,100. PATENTED SEPT. 3, 1907.
J. T. HARRIS.
MATTRESS MAKING MACHINE.
APPLICATION FILED JULY 19, 1906.

2 SHEETS—SHEET 1.

Witnesses
G. R. Thomas
F. B. MacKal

Inventor
J. T. Harris
By Chandler & Chandler
Attorneys

No. 865,100. PATENTED SEPT. 3, 1907.
J. T. HARRIS.
MATTRESS MAKING MACHINE.
APPLICATION FILED JULY 19, 1906.
2 SHEETS—SHEET 2.
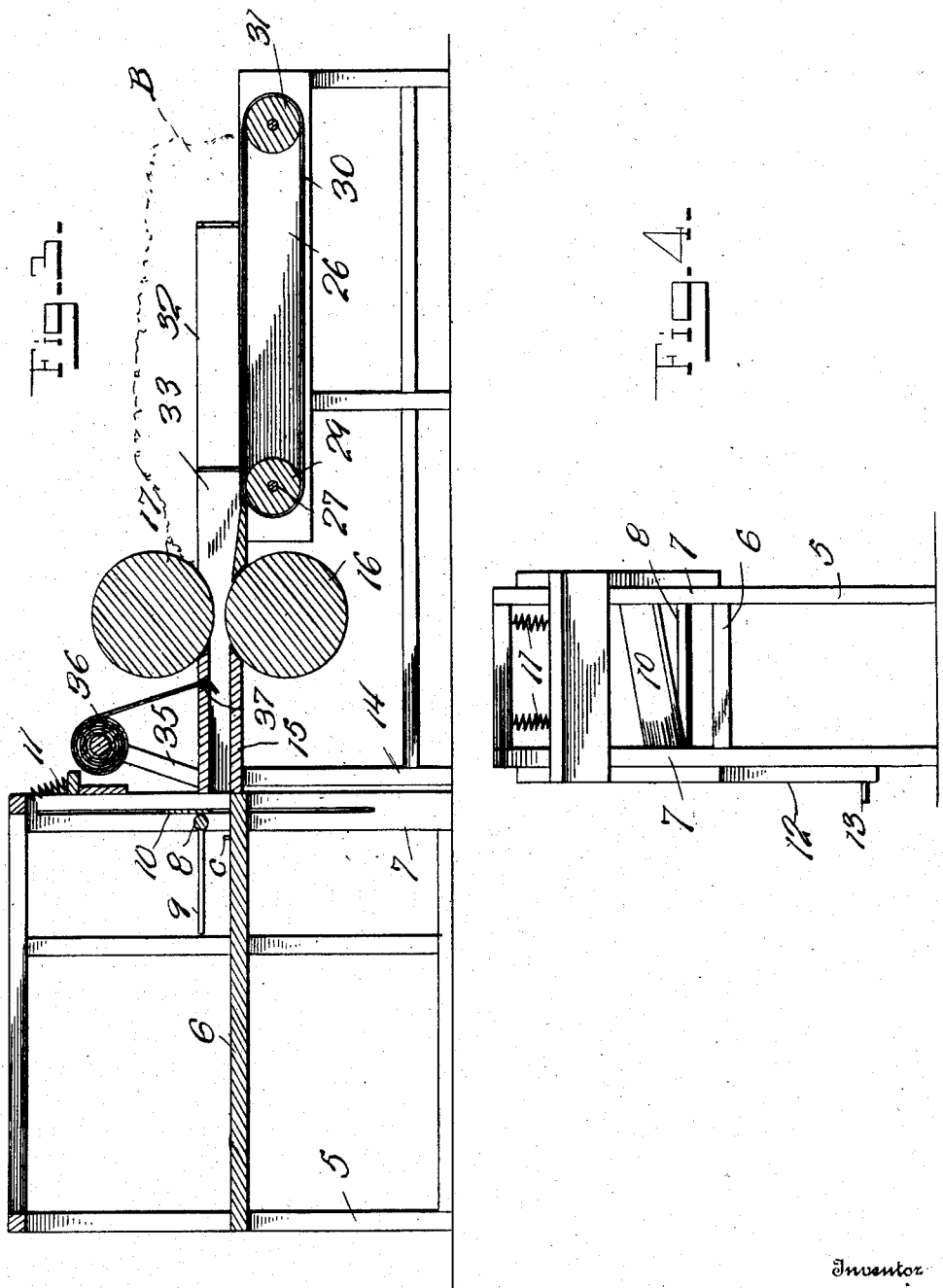

UNITED STATES PATENT OFFICE.

JOSEPH T. HARRIS, OF BLOOMINGDALE, FLORIDA.

MATTRESS-MAKING MACHINE.

No. 865,100.  Specification of Letters Patent.  Patented Sept. 3, 1907.

Application filed July 19, 1906. Serial No. 326,896.

*To all whom it may concern:*

Be it known that I, JOSEPH T. HARRIS, a citizen of the United States, residing at Bloomingdale, in the county of Hillsboro, State of Florida, have invented certain new and useful Improvements in Mattress-Making Machines; and I do hereby declare the following to be a full, clear, and exact description of the invention, such as will enable others skilled in the art to which it appertains to make and use the same.

This invention relates to mattress making machines and has for its object to provide a machine with which mattresses may be quickly and easily stuffed, another object being to provide a machine including a novel arrangement of parts, and one which will not be likely to become deranged.

Other objects and advantages will be apparent from the following description, and it is to be understood that I do not desire to be limited to the exact details of construction shown and described, for obvious modifications will occur to a person skilled in the art.

Figure 1:
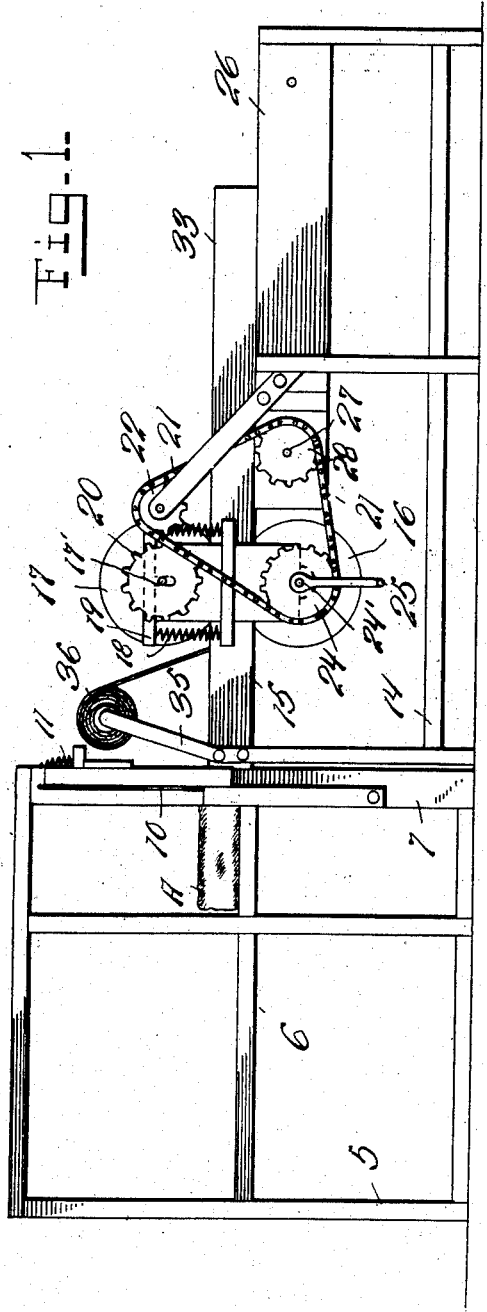
Figure 2:
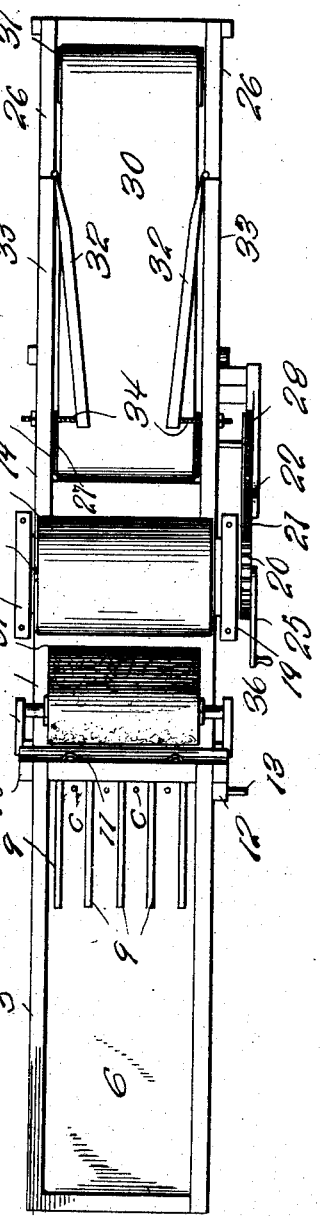

In the drawings forming a portion of this specification and in which like numerals of reference indicate similar parts in the several views, Figure 1 is a side elevation. Fig. 2 is a top plan view. Fig. 3 is a longitudinal vertical section taken centrally through Fig. 2. Fig. 4 is an elevation of the feed end of the machine.

Referring now to the drawings, the present invention comprises a frame 5 having a horizontal platform 6 therein. The forward uprights 7 are provided for the frame and between these uprights above the platform 6, there is pivoted a cross bar 8 having a plurality of rearwardly extending fingers 9 and slidably mounted in the uprights 7, there is a knife 10 having lifting springs 11 connected therewith. A downwardly extending rod 12 is connected with the knife and has an outwardly extending foot-piece 13 for the reception of the foot of the operator, to press the foot-piece downwardly and move the knife 10 downwardly to traverse the space above the forward end of the platform 6.

A frame 14 is located forwardly of the frame 5 and has feeding mechanism mounted therein, this feeding mechanism including a horizontal shaping box 15 mounted at the rearward end of the frame 14 and open at its rearward end to discharge into the space between the platform 6 and the cross bar 8, this cross bar and the fingers 9 forming what may be termed a tick-holder. Forwardly of the shaping box 15 there are mounted a pair of rollers 16 and 17, the latter being located above the former, and the roller 17 is held yieldably against upward movement and with its periphery engaging that of the roller 16, by means of springs 18 connected with a depressor plate 19 located above each trunnion 17' of the roller 17. One of these trunnions carries a sprocket 20, as shown, and the teeth of this sprocket engage in a sprocket chain 21 which is engaged with an idler sprocket 22 and with a sprocket 24 carried by an outwardly extending trunnion 24' of the roller 16, this sprocket 24 being provided with an operating crank 25.

The frame 14 includes longitudinally extending side boards 26 and journaled in the rearward ends of these side boards, there is a shaft 27 having a sprocket 28 with which the chain 21 is engaged, and between the side boards a drum 29 is mounted upon the shaft 27 and receives a continuous belt 30, the forward end of which is engaged with a drum 31 journaled between the side boards 26 at the forward ends thereof. False sides 32 are located between sills 33 mounted upon the side boards 26 and are adjustable through the medium of screws 34 to vary the distance between these false sides, and an upwardly extending frame 35 is carried by the frame 14 at the rearward end thereof and is adapted for the reception of a cotton roll 36 above the frame 14. The shaping box 15 is provided with an opening in its top for the passage of cotton therethrough into the shaping box from the frame 35.

In use, a tick A is disposed upon the forward portion of the platform 6 with the fingers 9 extending thereinto and filling material B is disposed upon the belt 30, the cotton 36 being passed through the opening 37 and starting into the shaping box as will be readily understood. Rotation of the crank 25 in one direction will move the filling material toward the rollers 16 and 17, the latter receiving it therebetween, and forcing it into the shaping box from which it passes in compact form into the tick A, the cotton 36 being carried with the filling material upon the top thereof, as will be readily understood. Suitable fasteners C are provided to hold the tick in position, and as the filling operation continues, the tick is extended on the rearward portion of the platform 6, as will be readily understood. When the mattresses have been filled, the knife 10 is moved downwardly, as will be readily understood, to cut off the filling material between the tick and the shaping box.

What is claimed is:

A machine of the class described comprising a frame, a platform in the frame, a tick distender located above the platform at the forward end thereof, vertical guides at the forward end of the frame, a knife slidably mounted in the guides, means for holding the knife yieldably at the upward limit of its movement, means for moving the knife downwardly, a frame located forwardly of the first named frame, a shaping box at the rearward end of the second frame and having an opening in its top, a bracket extending above the shaping box and adapted to receive material for the passage of said material therefrom through the opening of the shaping box, separable rollers journaled in the second frame forwardly of the shaping box for the passage of material therebetween to said shaping box, means for holding the rollers yieldably against separation, sprockets connected with the rollers, longitudinally spaced drums mounted in the frame forwardly of the rollers, a continuous belt engaged with the drums and arranged to discharge between the rollers, a sprocket wheel connected with one of the drums, a chain engaged around the sprocket wheel of one of the rollers and with that of the drum, an idler for the chain, the sprocket wheel of the other drum having its teeth at one side engaged in the chain, and an operating crank carried by one of the sprocket wheels.

In testimony whereof, I affix my signature, in presence of two witnesses.

J. T. HARRIS.

Witnesses:
NORBERTA MADERNGA,
J. T. YOUNG.